US007798845B1

(12) United States Patent
Buchanan

(10) Patent No.: US 7,798,845 B1
(45) Date of Patent: Sep. 21, 2010

(54) SAFETY PLUG ASSEMBLY

(76) Inventor: William J. Buchanan, 12 Jupiter Dr., Sewell, NJ (US) 08080

( * ) Notice: Subject to any disclaimer, the term of this patent is extended or adjusted under 35 U.S.C. 154(b) by 0 days.

(21) Appl. No.: 12/420,355

(22) Filed: Apr. 8, 2009

(51) Int. Cl.
*H02R 11/00* (2006.01)

(52) U.S. Cl. ........................ 439/502; 439/505; 439/932

(58) Field of Classification Search ................. 439/505, 439/502, 180, 498, 623, 490, 189, 932
See application file for complete search history.

(56) References Cited

U.S. PATENT DOCUMENTS

D302,422 S 7/1989 Justiano et al.
4,900,270 A * 2/1990 Edwards et al. ............. 439/502
4,946,396 A * 8/1990 Saitoh ........................ 439/500
D315,719 S 3/1991 Cusumano et al.
5,272,277 A * 12/1993 Humbles et al. ............ 174/520
5,427,542 A 6/1995 Gerow
5,462,452 A * 10/1995 Devine ....................... 439/505
5,904,591 A * 5/1999 Shiau ......................... 439/502
5,941,729 A 8/1999 Sri-Jayantha
5,961,207 A * 10/1999 Petkovic ..................... 362/376
6,007,373 A * 12/1999 Chew ......................... 439/504
6,364,675 B1 4/2002 Brauer et al.
6,461,192 B1 10/2002 Kwoka
6,910,911 B2 6/2005 Mellott et al.
6,988,897 B2 1/2006 Belongia et al.
2007/0212929 A1* 9/2007 Huang et al. ................ 439/498

* cited by examiner

*Primary Examiner*—Michael C Zarroli

(57) ABSTRACT

A safety plug assembly includes an electrical cord having a first end and a second end. The first end is electrically couplable to an electrically powered device. The second end comprises a male plug extendable into an electrical outlet. The electrical cord has a break therein to define a first section and a second section each having a free end. A first mating member and a second mating member are releasably connectable together to close an electrical circuit. Each of the free ends has one of the first and second mating members attached thereto. Each of the first and second mating members includes a male prong and a female receiver. The male prong of the first mating member is extendable in the female receiver of the second mating member and the male prong of the second mating member is extendable in the female receiver of the first mating member.

2 Claims, 3 Drawing Sheets

SAFETY PLUG ASSEMBLY

BACKGROUND OF THE DISCLOSURE

Field of the Disclosure

The disclosure relates to safety plug devices and more particularly pertains to a new safety plug device for preventing unauthorized usage of an electrically powered device.

SUMMARY OF THE DISCLOSURE

An embodiment of the disclosure meets the needs presented above by generally comprising an elongated electrical cord that has a first end and a second end. The first end is electrically couplable to an electrically powered device. The second end comprises a male plug that includes a pair of electrical prongs extendable into an electrical outlet. The electrical cord has a break therein to define a first section and a second section of the electrical cord each having a free end. A first mating member and a second mating member are releasably connectable together to close an electrical circuit. Each of the free ends has one of the first and second mating members attached thereto to allow the first section to be in electrical communication with the second section. Each of the first and second mating members includes a male prong and a female receiver. The male prong of the first mating member is extendable in the female receiver of the second mating member and the male prong of the second mating member is extendable in the female receiver of the first mating member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
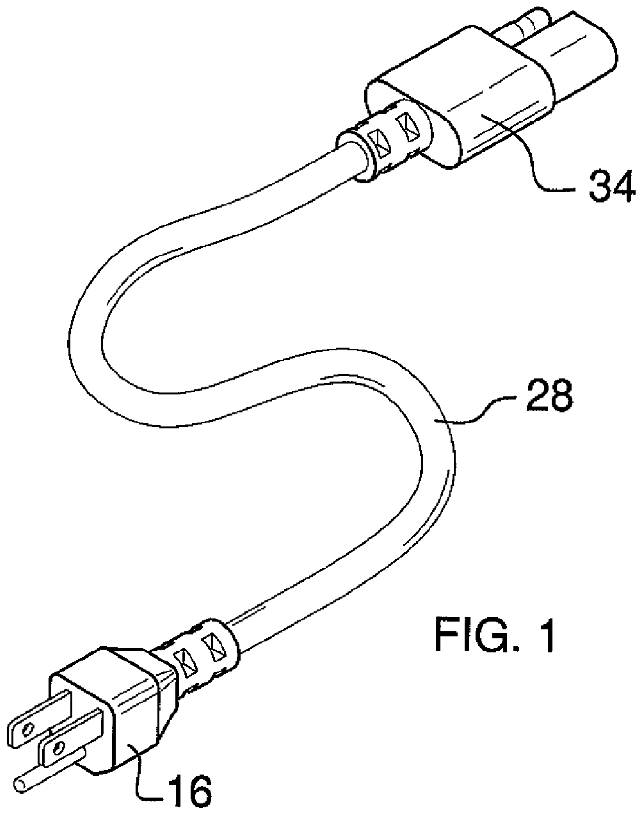
FIG. 1 is a top perspective view of a section of safety plug assembly according to an embodiment of the disclosure.
Figure 2:
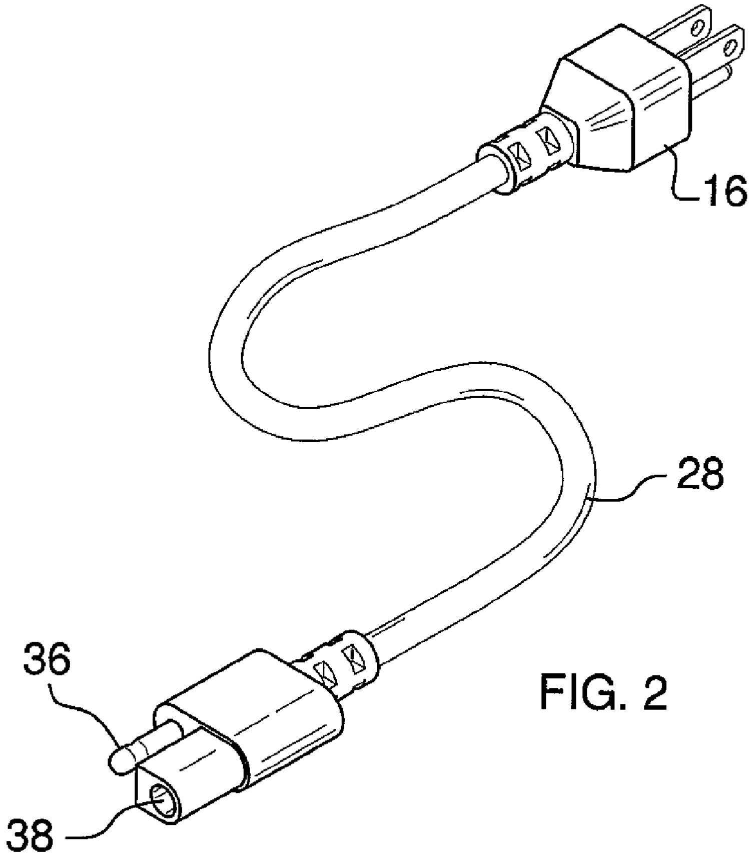
FIG. 2 is a bottom perspective view of the section of an embodiment of the disclosure.
Figure 3:
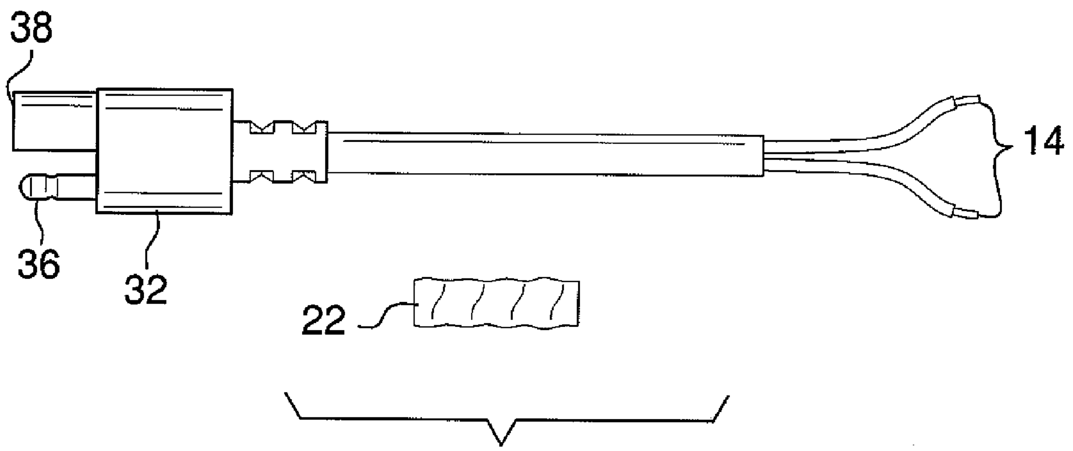
FIG. 3 is a side view of a section of an embodiment of the disclosure.
Figure 4:
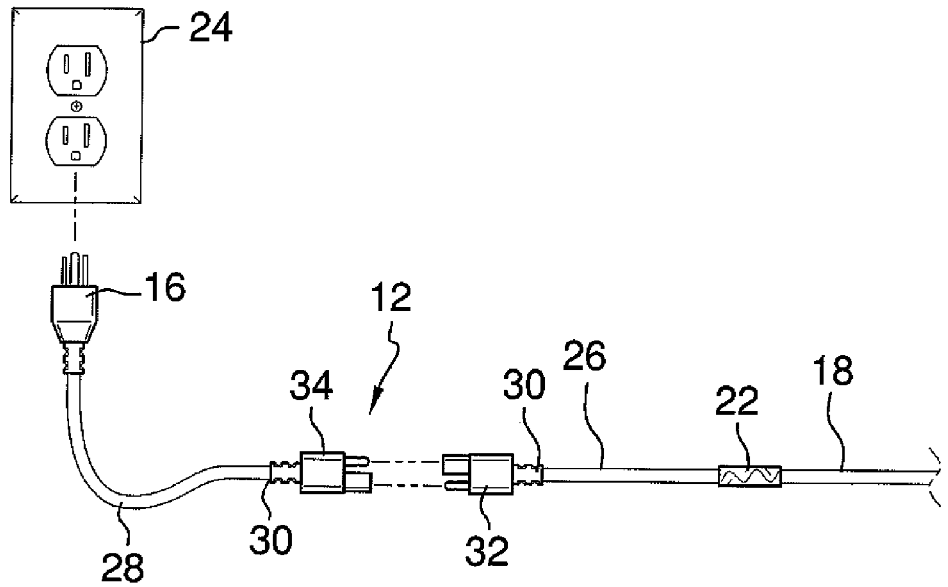
FIG. 4 is a side in-use view of an embodiment of the disclosure.
Figure 5:
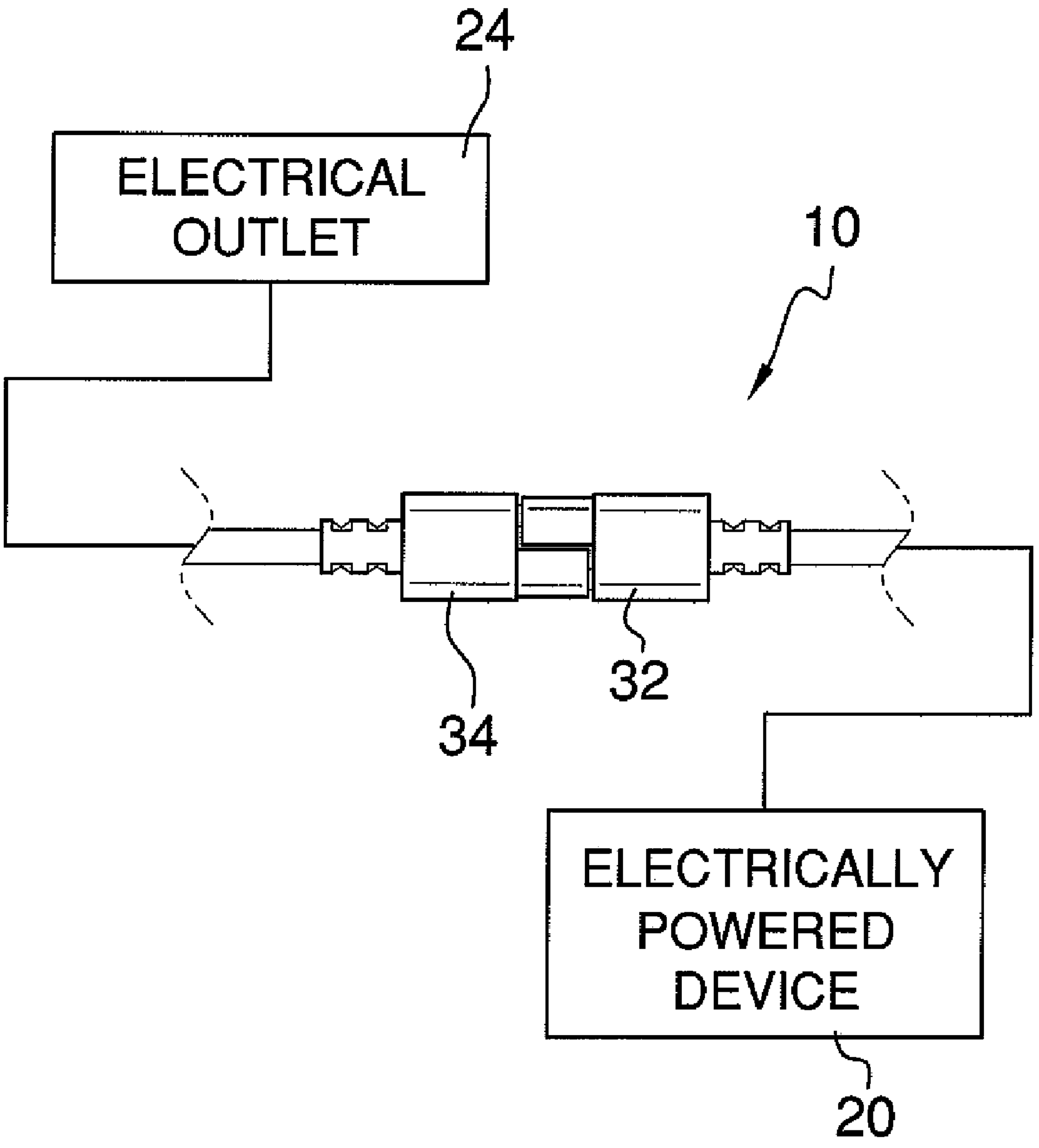
FIG. 5 is a schematic view of an embodiment of the disclosure.

With reference now to the drawings, and in particular to FIGS. 1 through 5 thereof, a new safety plug device embodying the principles and concepts of an embodiment of the disclosure and generally designated by the reference numeral 10 will be described.

As best illustrated in FIGS. 1 through 5, the safety plug assembly 10 generally comprises an elongated electrical cord 12 that has a first end 14 and a second end 16. The first end 14 is electrically couplable to a power cord 18 of an electrically powered device 20. The electrically powered device 20 may be any conventional electrically powered device, but typically will include those devices which may pose a danger, particularly small children. Therefore, the assembly 10 is particularly well suited for portable heating devices, power tools and the like. The first end 14 is electrically coupled to the power cord by conventionally splicing the first end 14 to the power cord 18 and then held in place with a fastening member, such as shrink wrap 22. Alternatively, the electrical cord 12 may form the power cord of the device 20. The second end 16 comprises a male plug that includes a pair of electrical prongs configured to be extendable into an electrical outlet 24. The second end 16 may also include a grounding prong. The electrical cord 12 has a break therein to define a first section 26 and a second section 28 of the electrical cord 12 each having a free end 30.

A first mating member 32 and a second mating member 34 are releasably connectable together to close an electrical circuit. Each of the free ends 30 has one of the first 32 and second 34 mating members attached thereto to allow the first section 32 to be in electrical communication with the second section 34. Each of the first 32 and second 34 mating members consists of a male prong 36 and a female receiver 38. The male prong 36 of the first mating member 32 is extendable in the female receiver 38 of the second mating member 34 and the male prong 36 of the second mating member 34 is extendable into the female receiver 38 of the first mating member 32.

In use, the electrical cord 12 is used in a conventional manner to provide electricity to the electrically powered device 20. However, when the second section 28 of the electrical cord 12, which includes the second end 16, is removed from the first section 26, the electrically powered device 20 cannot be plugged into a standard outlet 24. This will prevent unauthorized use by simply securing only a portion of a cord as opposed to securing the entire device 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A safety plug kit assembly consisting of:

an electrically powered device, said electrically powered device being a power tool, said power tool having a power cord;

an elongated electrical cord having;

a first end and a second end, said second end comprising a male plug including a pair of electrical prongs configured to be extendable into the electrical outlet, said electrical cord having a break therein to define a first section and a second section of said electrical cord each having a free end;

a first mating member and a second mating member being releasably connectable together to close an electrical circuit, each of said free ends having one of said first and second mating members attached thereto to allow said first section to be in electrical communication with said second section, each of said first and second mating members consisting of a male prong and a female receiver, said male prong of said first mating member being extendable in said female receiver of said second mating member, said male prong of said second mating member being extendable in said female receiver of said first mating member;

said first end being electrically coupled to the power cord of the electrically powered device in a retrofitted manner by splicing the first end to the power cord; and a shrink wrap being positioned over a connection of said first end and said power cord.

2. A safety plug kit being connectable to a power plug of a power tool, said kit including:

an elongated electrical cord having;

a first end and a second end, said second end comprising a male plug including a pair of electrical prongs configured to be extendable into the electrical outlet, said electrical cord having a break therein to define a first section and a second section of said electrical cord each having a free end;

a first mating member and a second mating member being releasably connectable together to close an electrical circuit, each of said free ends having one of said first and second mating members attached thereto to allow said first section to be in electrical communication with said second section, each of said first and second mating members consisting of a male prong and a female receiver, said male prong of said first mating member being extendable in said female receiver of said second mating member, said male prong of said second mating member being extendable in said female receiver of said first mating member;

wherein said first end is electrically couplable to the power cord of the electrically powered device in a retrofitted manner by splicing the first end to the power cord; and a shrink wrap being positionable over a connection of said first end and the power cord.

* * * * *